Nov. 18, 1941.     G. C. KRUEGER     2,263,504
MANURE CONVEYER
Filed May 26, 1941     3 Sheets-Sheet 1
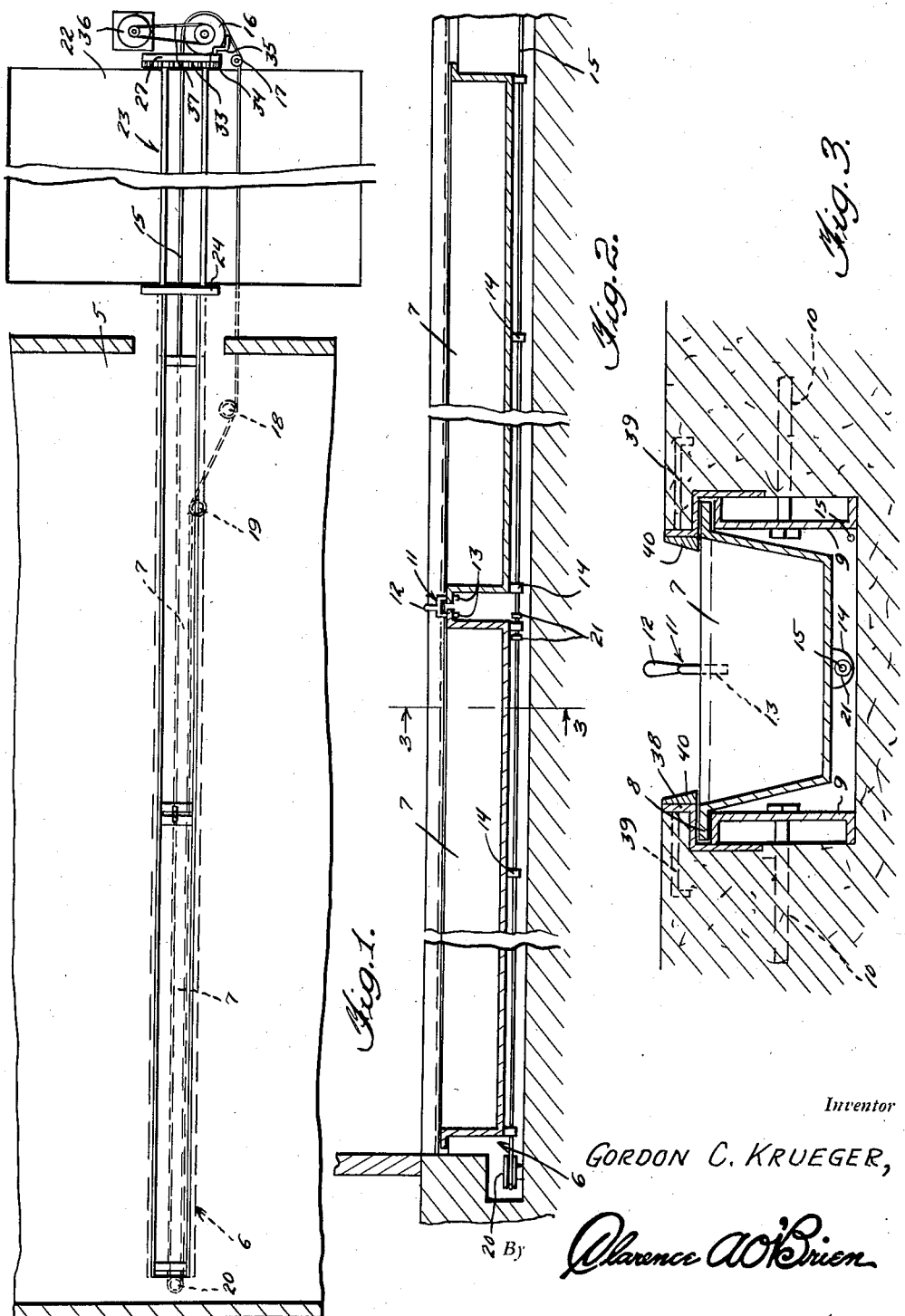
Inventor
GORDON C. KRUEGER,
By Clarence A. O'Brien
Attorney

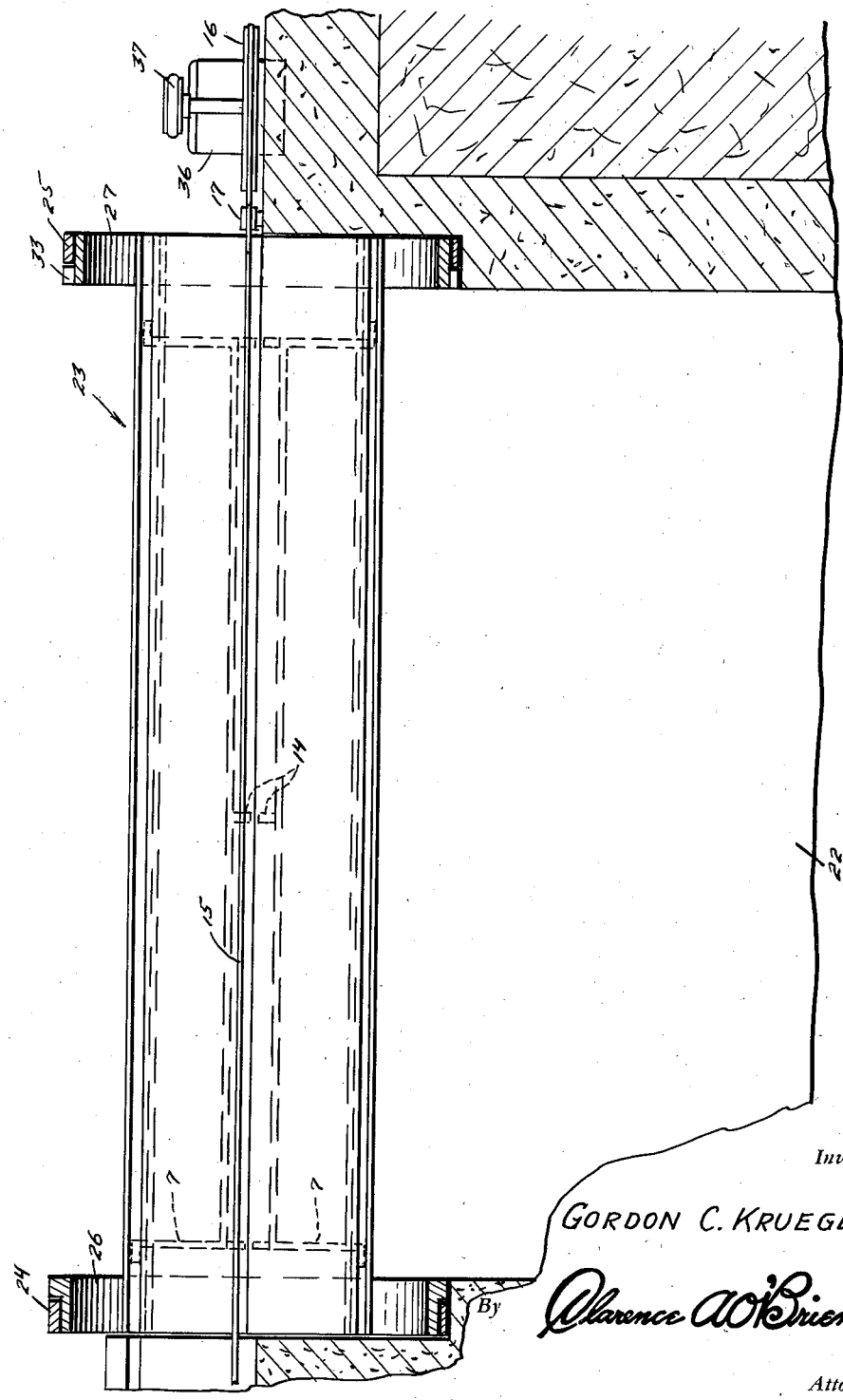

Nov. 18, 1941.    G. C. KRUEGER    2,263,504
MANURE CONVEYER
Filed May 26, 1941    3 Sheets-Sheet 3
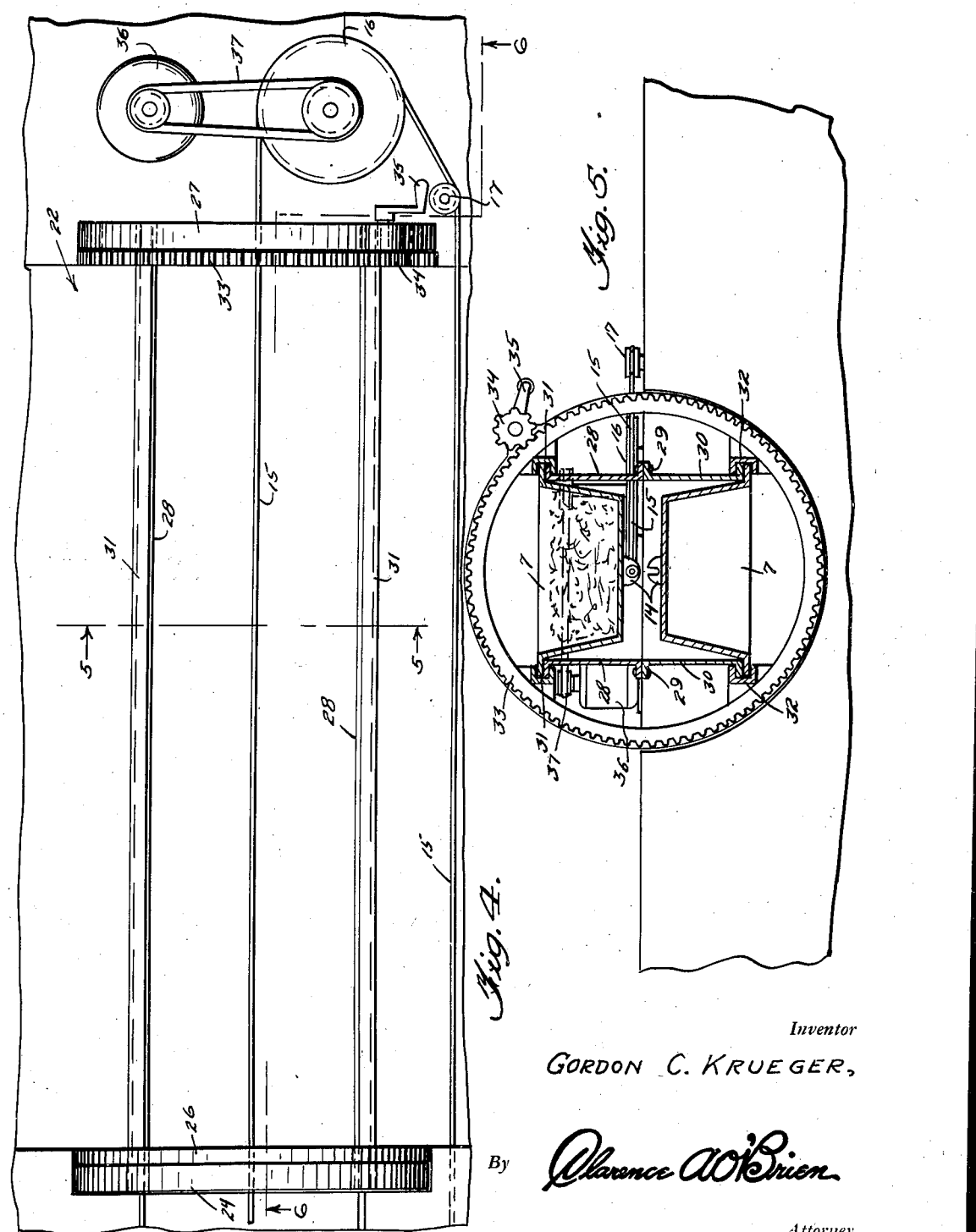
Inventor
GORDON C. KRUEGER,
By *Clarence A.O'Brien*
Attorney Patented Nov. 18, 1941

2,263,504

UNITED STATES PATENT OFFICE 2,263,504

MANURE CONVEYER

Gordon C. Krueger, Ripon, Wis.

Application May 26, 1941, Serial No. 395,285

1 Claim. (Cl. 214—52)

This invention relates to improvements in manure or litter collectors or conveyers, designed for use in connection with dairy farms and the like for collecting the litter or manure, and the handling of the collected litter, including the dumping of the same exteriorly of the barn, all in a manner expediting such work, reducing manual labor in the performance of such work, and in a way as will permit the accomplishment of the collecting and dumping of the litter in a simple, handy and efficient manner tending materially to promote sanitation.

The invention together with its objects and advantages will be best understood from a study of the following description taken in connection with the accompanying drawings wherein:

Figure 1 is a view showing in top plan, and somewhat diagrammatically, the conveyer embodying the features of the present invention, with a portion of the barn shown fragmentarily and in horizontal section.

Figure 2 is a longitudinally vertical sectional view through the trough and conveyer pans working therein.

Figure 3 is a transverse sectional view taken substantially on the line 3—3 of Figure 2.

Figure 4 is an enlarged plan view of the track assembly disposed over the collection pit in accordance with the present invention.

Figure 5 is a transverse sectional view through the assembly shown in Figure 4 and taken substantially on the line 5—5 of Figure 4.

Figure 6 is a longitudinal detail sectional view taken substantially on the line 6—6 of Figure 4.

Referring more in detail to the drawings, the reference numeral 5 indicates the floor of a dairy or other barn. The gutter, which extends lengthwise in the barn at the rear ends of the stalls, is indicated by the reference numeral 6, and, as is known, has as its object, generally, the temporary collection of the litter or manure, as well as for draining the floor.

However, in accordance with the present invention, there is arranged in the gutter 6 a conveyer that in the present instance comprises a plurality, two being shown, of elongated trays 7—7.

The trays 7 have the walls thereof provided with outstanding flanges 8 that ride on tracks 9 mounted in the gutter 6 and secured therein through the medium of bolts or other fastening elements 10, as best shown in Figure 3.

The trays 7 are detachably hitched or coupled together through the medium of a coupling fork 11 equipped with a handle 12 to facilitate manipulation of the same, and having the legs 13 thereof designed to fit in suitable apertures provided therefor in the flanges 8 at the ends of the trays, and as clearly shown in Figure 2.

The flanges 8 riding on the tracks 9, as shown in Figure 3, serve to support the bottoms of the trays 7 above the bottom of the gutter 6, thus leaving clearance for slotted lugs 14 provided on and depending from the bottoms of the trays as shown.

For moving the trays 7 lengthwise of the gutter 6, there is provided a cable 15 windable on a drum 16 and trained over pulleys 17, 18, 19 and 20 in the manner clearly shown.

The run of the cable is accommodated in the slots of the lugs 14, and at a suitable place in the length of the run of the cable are spaced abutment collars 21 as shown in Figure 2 to engage a lug 14 to transmit movement of the cable to the coupled trays 7.

At a desired location exteriorly of the barn there is provided a dumping pit 22 which may be fabricated of concrete, or as otherwise found desirable, to receive the contents of the trays 7.

To facilitate the dumping of the trays 7 over the pit 22, there is provided a revolving track assembly indicated generally by the reference numeral 23.

The revolving track assembly 23 embodies a pair of fixed annular frame members 24, 25 mounted at opposite sides of the pit 22 as shown in Figure 6, and in which are revolubly mounted annular track-carrying frames 26, 27, respectively.

Extending between and suitably, positively connected with the revoluble annular frames 26, 27 is a track assembly which embodies a pair of opposed rails 28 which at their base flanges are riveted or otherwise secured as at 29 to the base flanges of a second pair of rails 30—30 as shown in Figure 5.

The head flanges of the rails 28 are accommodated in pan-retaining channel members 31 while the head flanges of the rails 30 are accommodated in similar retaining channels 32; the retaining channels 31, 32 extending between the annular members 26, 27 and being suitably secured at their ends to the members 26, 27 interiorly of said members as also best shown in Figure 5.

The assembly 23 is so located relative to the gutter 6 as to facilitate the placing of a selected pair of rails 28, 30 as the case may be, in alignment with the rails 9 so that a conveyer tray or pan 7 may readily pass from the rails 9 onto the aligned rails 28 or 30, as the case may be.

From the foregoing it will be seen that when it is desired to dump the contents of the trays 7, the drum 16 is placed in operation to cause the cable 15 to go into operation for causing the trays 7 to move longitudinally of the gutter 6. As the trays pass out of the barn 5 the foremost tray will transfer from the rails 9 onto the uppermost pair of rails, in the present instance the rails 28, of the revolving track assembly 23; the flanges of the tray 7 being accommodated in the retaining channels 31 to be held thereby in proper contact with the rails 28 to prevent displacement of the tray 7.

When the tray 7 has been thus properly positioned on, for example, the rails 28, the coupling pin 11 is removed thus permitting the contents of the tray 7 on the rails 28 to be dumped by rotation of the track assembly 23 through 180°.

In connection with the above it will be noted that the annular member 27 is provided on its exterior with an integral gear 33 with which a small pinion gear 34, suitably mounted in proximity to the frame 27, is in mesh. Preferably the pinion gear 34 is hand-operated and to that end is equipped with a crank 35.

From the above, then, it will be seen that by turning the crank 35 the annular frames 26, 27 and associated tracks will be caused to revolve, thus completely inverting the tray 7 so that the contents thereof will fall into the pit 22.

At the same time this operation will bring the other pair of tracks, namely the tracks 30—30, into alignment with the tracks 9 so that the second tray may then be moved onto the tracks 30 which are now uppermost in order that, through the operation just described, the contents of the second tray may be dumped into the pit.

It will be obvious that in turning the track assembly 23 to dump the second tray, the tray first dumped will then move to the uppermost position so as to be readily shifted from the tracks 28 onto the tracks 9.

After the second tray has been dumped, the assembly 23 is then again manipulated in order to bring the second tray into upright position, in which position it may then be again coupled to the tray first dumped, and the trays then moved into proper position within the gutter 6 so that the collecting and dumping operation just described may be repeated.

Preferably, in accordance with the present invention, the cable drum 16 is driven from a reversible electric motor 36 through a belt and pulley, or other suitable drive assembly 37 as shown in Figure 4.

It will thus be seen that with a device of this character, little or no manual handling of the conveyer trays 7 is required, either in the positioning of the trays in the gutter 6, or in the removal of the trays from the gutter, or in the dumping of the contents of the tray.

Also in accordance with the present invention, the edge of the barn floor 5, at opposite sides of the gutter 6, are reinforced by angular metallic plates 38 anchored in position through the medium of anchoring bolts 39.

Also mounted on the reinforcing plates 38 and extending lengthwise of the gutter 6 for the full length of the track rails 9, are scraper elements 40 that are so positioned with respect to the walls of the trays 7 as to scrape the litter and manure from the upper edges of these walls, and as otherwise would tend to collect on the walls at the tops of the respective trays. Thus the provision of these scrapers will tend further to promote sanitation and to assist in promoting cleanliness in the barn or other similar structure.

It is thought that the manner of use, together with the many advantages of a conveyer embodying the features of the present invention will be understood without further detailed description.

It is to be understood that I do not wish to limit myself to the precise details of construction, combination and arrangement of elements as herein illustrated and described, since changes may be made by others working in the art.

Having thus described the invention what is claimed as new is:

In a conveying and dumping assembly, and in combination with the gutter formed in the floor of a barn or the like, conveyer trays movable within the gutter lengthwise thereof, means detachably connecting said trays in tandem, a revoluble tray-dumping assembly mounted adjacent one end of the gutter to receive a tray issuing from the gutter for turning the tray upside down to empty the same of its contents, said assembly including opposed, aligned, annular frames, supporting elements for said frames, and rails extending between and connected at their respective opposite ends to said annular frames to turn therewith, said rails being adapted to accommodate therebetween two trays disposed one above the other so that as one tray is in inverted position to discharge the contents thereof the other tray is in an upright position in substantial alignment with the gutter, and mechanism connected with said trays for causing the latter to move lengthwise of the gutter and to pass therefrom onto the aforementioned rails of said revoluble tray-dumping assembly.

GORDON C. KRUEGER.